United States Patent
Polo et al.

(10) Patent No.: US 10,613,211 B2
(45) Date of Patent: Apr. 7, 2020

(54) VIRTUAL ANGLE-OF-ARRIVAL/ANGLE-OF-DEPARTURE TRACKING

(71) Applicant: Avago Technologies International Sales Pte. Limited, Singapore (SG)

(72) Inventors: Angel Polo, Solana Beach, CA (US); Mike David Herndon, Laguna Niguel, CA (US); Tom F. Baker, Monarch Beach, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 224 days.

(21) Appl. No.: 15/705,723

(22) Filed: Sep. 15, 2017

(65) Prior Publication Data

US 2018/0074188 A1      Mar. 15, 2018

Related U.S. Application Data

(60) Provisional application No. 62/395,104, filed on Sep. 15, 2016.

(51) Int. Cl.
| | |
|---|---|
| *G01S 13/68* | (2006.01) |
| *G01S 13/42* | (2006.01) |
| *G01S 5/00* | (2006.01) |
| *G01S 3/28* | (2006.01) |
| *G01S 13/74* | (2006.01) |

(52) U.S. Cl.
CPC ............... *G01S 13/68* (2013.01); *G01S 3/28* (2013.01); *G01S 5/00* (2013.01); *G01S 13/42* (2013.01); *G01S 13/74* (2013.01)

(58) Field of Classification Search
CPC ... G01S 3/28; G01S 5/02; G01S 13/42; G01S 13/68; G01S 13/74
USPC ........................................................ 342/417
See application file for complete search history.

(56) References Cited

U.S. PATENT DOCUMENTS

| | | | |
|---|---|---|---|
| 2003/0085840 A1* | 5/2003 | Benner | ................. G01S 7/4004 342/450 |
| 2016/0105761 A1* | 4/2016 | Polo | .................... H04W 56/001 455/41.2 |

\* cited by examiner

*Primary Examiner* — Dao L Phan
(74) *Attorney, Agent, or Firm* — Foley & Lardner LLP

(57) ABSTRACT

In some aspects, the disclosure is directed to methods and systems for virtual angle-of-arrival (AoA) or angle-of-departure (AoD) tracking for virtually tracking multiple Targets. The wireless devices (e.g. Tracker and Targets) may participate in a mesh configuration and share data within the mesh. A first device may purport to be a virtual tracker, while acting as an AoA or Angle of Departure (AoD) Target. The devices being tracked (e.g. virtual targets), may instead operate as Trackers. Processor- and energy-intensive calculations may be distributed to the virtual targets and transmitted via the mesh for aggregation at the virtual tracker.

18 Claims, 8 Drawing Sheets

VIRTUAL ANGLE-OF-ARRIVAL/ANGLE-OF-DEPARTURE TRACKING

RELATED APPLICATIONS

The present application claims the benefit of and priority to U.S. Provisional Application No. 62/395,104, entitled "Virtual Angle-of-Arrival/Angle-of-Departure Tracking," filed Sep. 15, 2016, the entirety of which is hereby incorporated by reference.

FIELD OF THE DISCLOSURE

This disclosure generally relates to systems and methods for device triangulation wireless communication via antenna arrays.

BACKGROUND OF THE DISCLOSURE

Wirelessly communicating devices may utilize a plurality of antennas, deployed in an array, for beamforming and directional communication with other devices, increasing signal-to-noise ratios, bandwidth, and overall efficiency, as well as for determining relative positioning or tracking of a wireless device within a two or three-dimensional space. However, these techniques require knowledge of relative spatial positioning of the devices so that the transmitting and receiving arrays may be properly tuned, and accordingly have high processing costs.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for virtual angle-of-arrival and angle-of-departure tracking; and Section B describes a network environment and computing environment which may be useful for practicing embodiments described herein.

A. Virtual Angle-of-Arrival and Angle-of-Departure Tracking

Figure 1A:
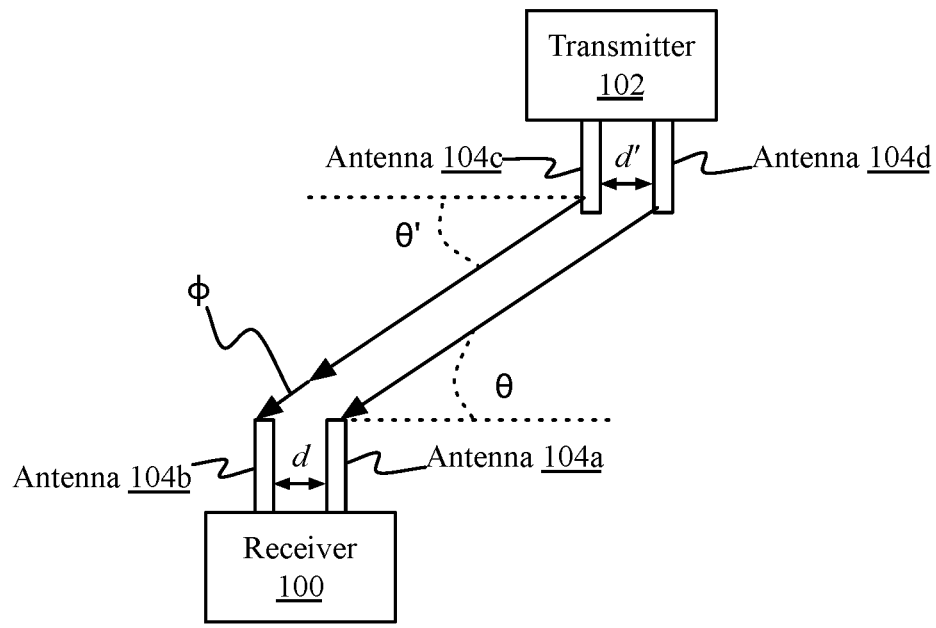
FIG. 1A is a block diagram illustrating an implementation of Angle of Arrival measurement by a Tracker and Target.
Figure 1B:
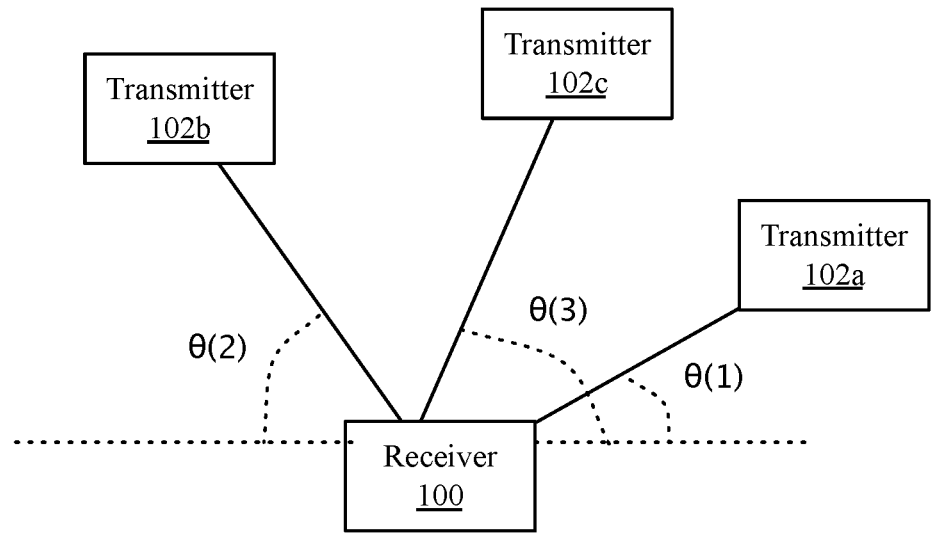
FIG. 1B is a block diagram illustrating an implementation of position triangulation by a Tracker.

Wireless devices, such as Bluetooth Low Energy (BLE) devices, can deploy antenna arrays with known spatial and element characteristics (e.g. distance between elements, frequency tuning, etc.) for the purposes of obtaining relative angular positioning of a transmitting device by a receiving device. For example, referring briefly to FIG. 1A, illustrated is a simplified diagram of a multi-antenna receiver 100 and a transmitter 102, not drawn to scale. Receiver 100 may have two (or more) antennas 104a-104b, and may be positioned at an angle $\theta$ from transmitter 102. A broadcast signal from transmitter 102 may arrive at antenna 104a and 104b at slightly different times, varying based on angle $\theta$, and measurable as a phase difference $\phi$ due to the slightly longer path required for arrival at one antenna due to antenna separation d. For example, in some implementations, the phase difference $\phi$ may be equal to $(2\pi d \sin \theta)/\lambda$, where $\lambda$ is the wavelength of the broadcast signal. The receiver may accordingly determine the angle of arrival (AOA) of the incoming signal from the transmitter. Given multiple transmitters 102a-102c at known positions, as shown in FIG. 1B, the receiver 100 may measure each angle of arrival and triangulate its position. In some implementations, the receiver 100 may also measure distance to a transmitter based on a known broadcast signal strength, a measured received signal strength, and an assumed or predetermined attenuation factor for the intervening medium (e.g. typically air). As shown in FIG. 1A, the transmitter 102 may also have multiple antennas (e.g. antennas 104c and 104d) separated by distance d'. A similar calculation may be used to determine angle of departure (AOD). Although shown with AOA $\theta$ approximately equal to AOD $\theta$', in many implementations, these angles may be different.

The protocol relationship and physical interface (PHY) linkage between the two devices can be either in a connectionless broadcast model or a connection oriented model. In many implementations, a transmitter 102 or device transmitting a tracking sequence may be referred to as a "Target", while the receiver 100 or device receiving the sequence may be referred to as a "Tracker". The Tracker may extract amplitude (I) & phase (Q) samples from its receiver modem to feed this information into an algorithm such as the equation identified above to calculate the angular relationship between the devices.

From the perspective of the compute and resource workload, the Tracker is much more heavily loaded when compared to the Target. The Target is responsible for transmitting a continuous sequence of bits, referred to as a targeting sequence, distributed over one to many antenna array elements. Compared to a typical BLE transmitter, the Target must exhibit precise control of an antenna array switch during this procedure. However, this control process can be considered a very light weight process and can easily be implemented in hardware.

The Tracker, on the other hand, performs a more complex process: the Tracker must lock onto and receive the Transmitter's targeting sequence at a plurality of receive array elements, and must perform very fast measurements at each element. the Tracker must convert the received signals into I & Q samples collected several times during a transmission occurrence. To combat the temporal effects of reflections which can distort signal origin, the receiver may collect similar samples over many operating frequencies. Once enough samples have been collected, the entire accumulated sample set is then fed into a compute algorithm.

This compute algorithm running on the Tracker may compute trigonometric angular relationships between the Tracker and the target using floating point trigonometric functions, as discussed above, for each pair of antennas in the array, for each received signal, and for each operating frequency. The compute algorithm may then perform a correlation vector analysis against a pre-recorded characterization model that assimilates performance data from both the Target's and Tracker's antenna array configuration. This correlation vector analysis may include vector and matrix transformations over the characterization data. This may result in several hundred or thousand matrix multiplications, again including floating point operations. Additionally, the array characterization model may be hundreds of kilobytes or megabytes in size and may be unique for each Target configuration. Storing such a model can require large amounts of memory.

In some implementations, the Tracker may attempt to smooth angular representation over time by employing Kalman or Complementary Filters, and/or by using other data from accompanying platform gyroscopes or accelerometers. This may again translate into added matrix transformations or other forms involving multiplications.

Figure 1C:
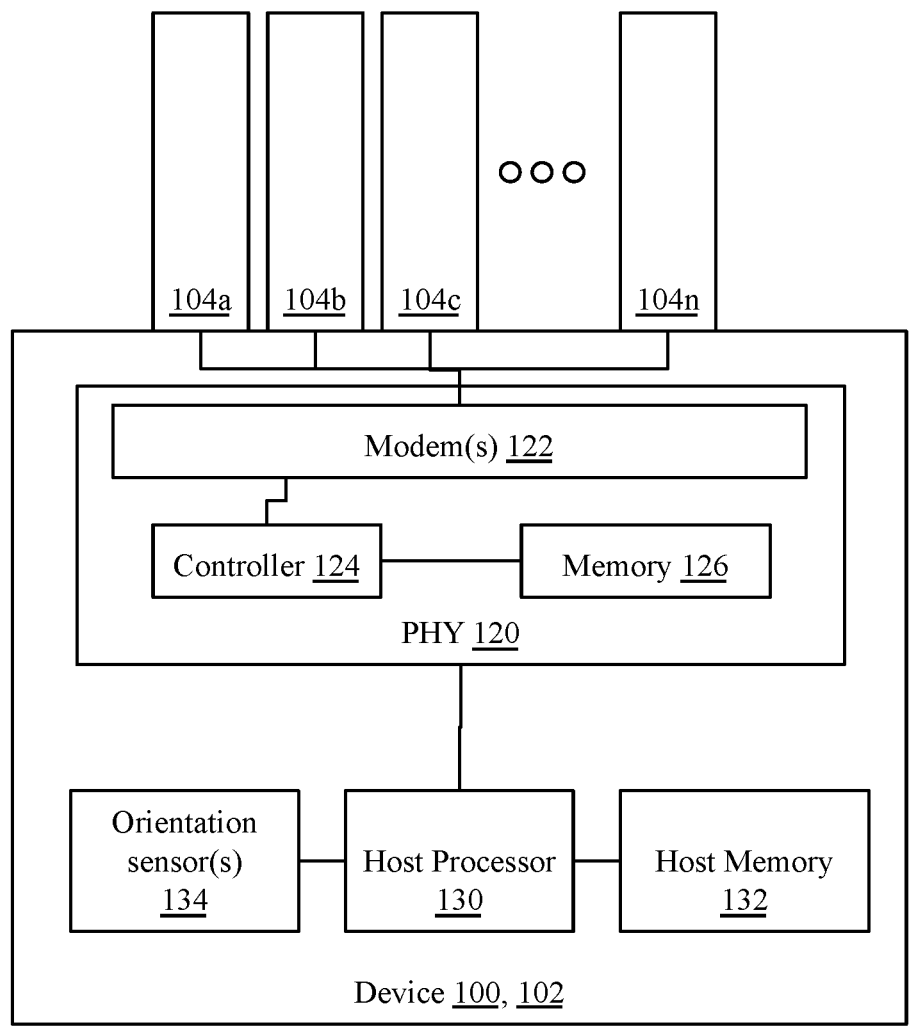
FIG. 1C is a block diagram of an implementation of a Tracker or Target device.

For example, referring briefly to FIG. 1C, illustrated is a block diagram of a receiving device 100 or transmitting device 102, such as BTLE beacons or devices, smart phones, tablet computers, wearable computers, laptop computers, desktop computers, appliances, or other such devices. Each device 100, 102 may comprise one or more antennas 104a-104n, which may be connected to a physical interface 120, such as a BTLE interface or WiFi interface. The physical interface 120 may comprise one or more modems 122 (e.g. one per antenna 104, or one for multiple antennas 104 with added switching hardware). The modem may comprise one or more amplifiers, tuners, filters, or other such components. The modem 122 may be controlled by a controller 124 of the physical interface 120, which may be any type and form of processor. The host controller 124 may communicate with a memory device 126, such as flash storage, RAM, DRAM, or any other type of memory device. Memory 126 may store parameters of the antenna array, such as distances d between pairs of antennas, tuning parameters, or other such features, such as an array characterization model as discussed above.

In some implementations, the device 100, 102 may comprise a host processor 130, which may communicate with a host memory 132. In some implementations, AoA and position calculations may be performed by a wireless network interface 120 or a BLE controller 124, while in other implementations, these operations may be performed by a host processor 130 of the receiving device, or by a combination of the network interface 120 and host processor 130. If a wireless interface or BLE controller does not support floating point instructions sets, in some implementations, conversion to and from fixed point calculations may be employed. As discussed above, device 100, 102 may use additional data from accompanying platform gyroscopes or accelerometers or other orientation sensors 134 to further refine a position of the device.

As discussed above, tracking a single Target by the Tracker or determining relative positioning is computation- and resource-intensive. Accordingly, these operations may require additional power consumption. For battery operated devices, such as smart phones or wearable electronics, this may reduce operational capabilities and operation time between recharging. Furthermore, the calculations become proportionally worse when attempting to track multiple Targets by a single Tracker.

Accordingly, the systems and methods discussed herein provide a reduced-power, more energy-efficient method for virtually tracking multiple Targets. The wireless devices may participate in a mesh configuration and share data within the mesh, or inter-device. A first device, such as a smart phone or wearable device, may purport to be a virtual tracker, while acting as an AoA or Angle of Departure (AoD) Target. The devices being tracked (e.g. virtual targets), may instead operate as Trackers.

Figure 2A:
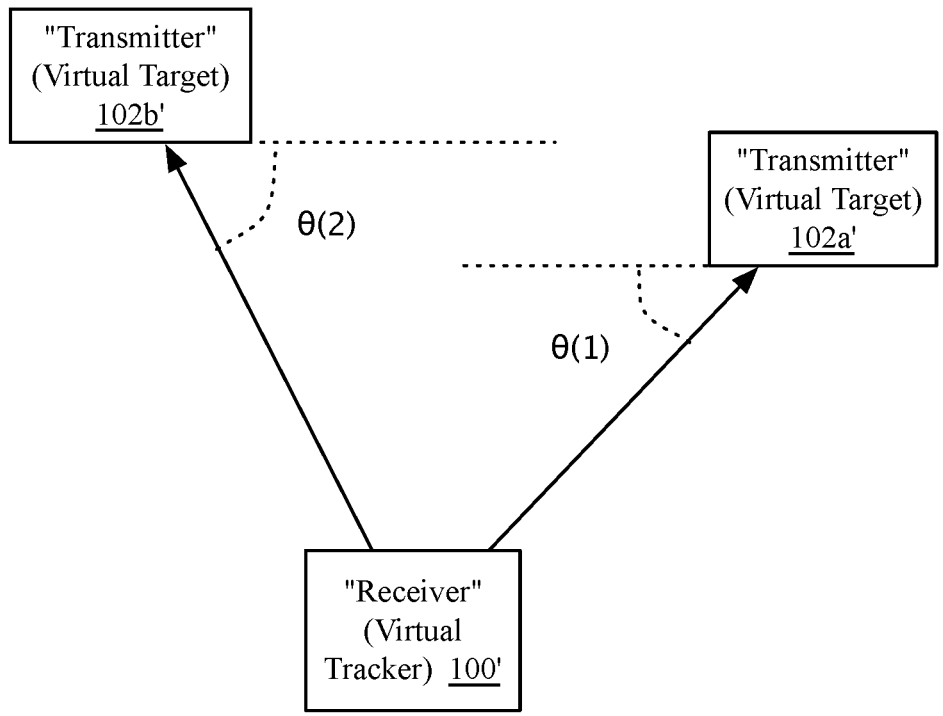
FIGS. 2A-2C are diagrams of a virtual Tracker/virtual Target position measurement system.
Figure 2B:
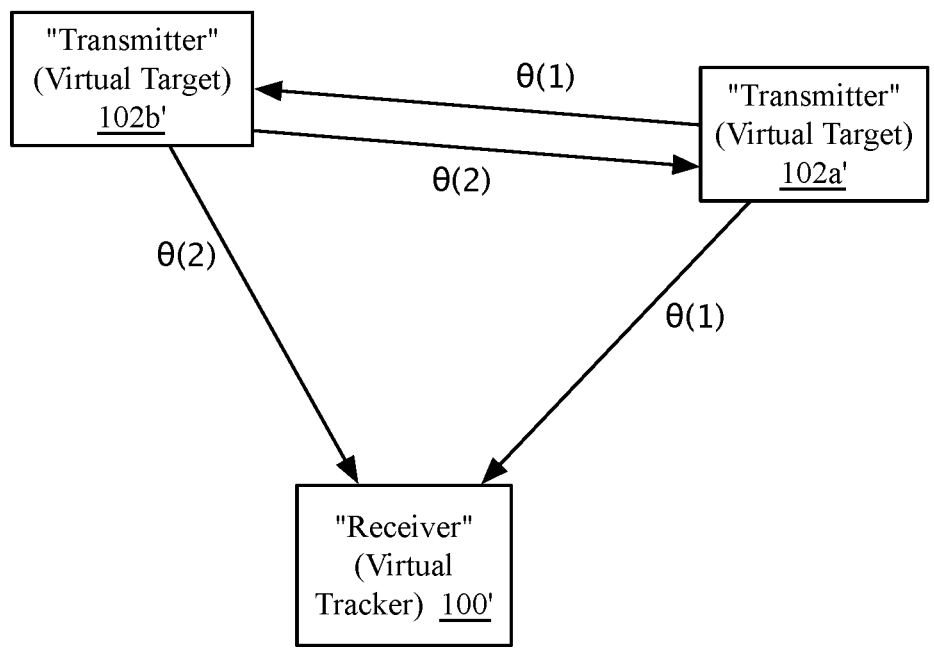

Referring briefly to FIGS. 2A and 2B, illustrated is an implementation of Virtual Tracking according to the systems and methods discussed herein. The virtual tracker 100', corresponding to the receiver 100 discussed in connection with FIG. 1A, transmits an AoA/AoD sequence while the devices being tracked 102' (e.g. beacons, access points, appliances, etc., corresponding to transmitters 102 of FIG. 1A) each receive the sequence from the broadcast and perform the calculations discussed above, determining their own relative orientations (e.g. $\theta(1)$ and $\theta(2)$) to the virtual tracker device 100'. Each virtual target device 102' then broadcasts the result of its communication to all other members of the mesh network, as shown in FIG. 2B, reaching the virtual tracker device 100' within a very short amount of time. The virtual tracker can then make use of this information such as in a display back to the user to display the positions of the all other devices participating, for beamforming, position sensing, augmented reality, etc. In this manner, the virtual tracker appears to be simultaneously tracking all participating virtual target devices without requiring the corresponding compute and resource overhead. The virtual target devices may be connected to additional power sources, freeing them of battery concerns. Thus, while labeled as a "receiver", rather than acting as the receiver or tracker of FIGS. 1A-1B, the device is actually broadcasting the sequence as a transmitter, and is thus referred to as a "virtual tracker". Similarly, while labeled as "transmitters", rather than acting as the transmitter or target of FIGS. 1A-1B, each other device is receiving the broadcast from the virtual tracker, measuring AoA/AoD, and providing the resulting measurements back to the virtual tracker for aggregation and position triangulation, and are therefore referred to as "virtual targets".

Figure 2C:
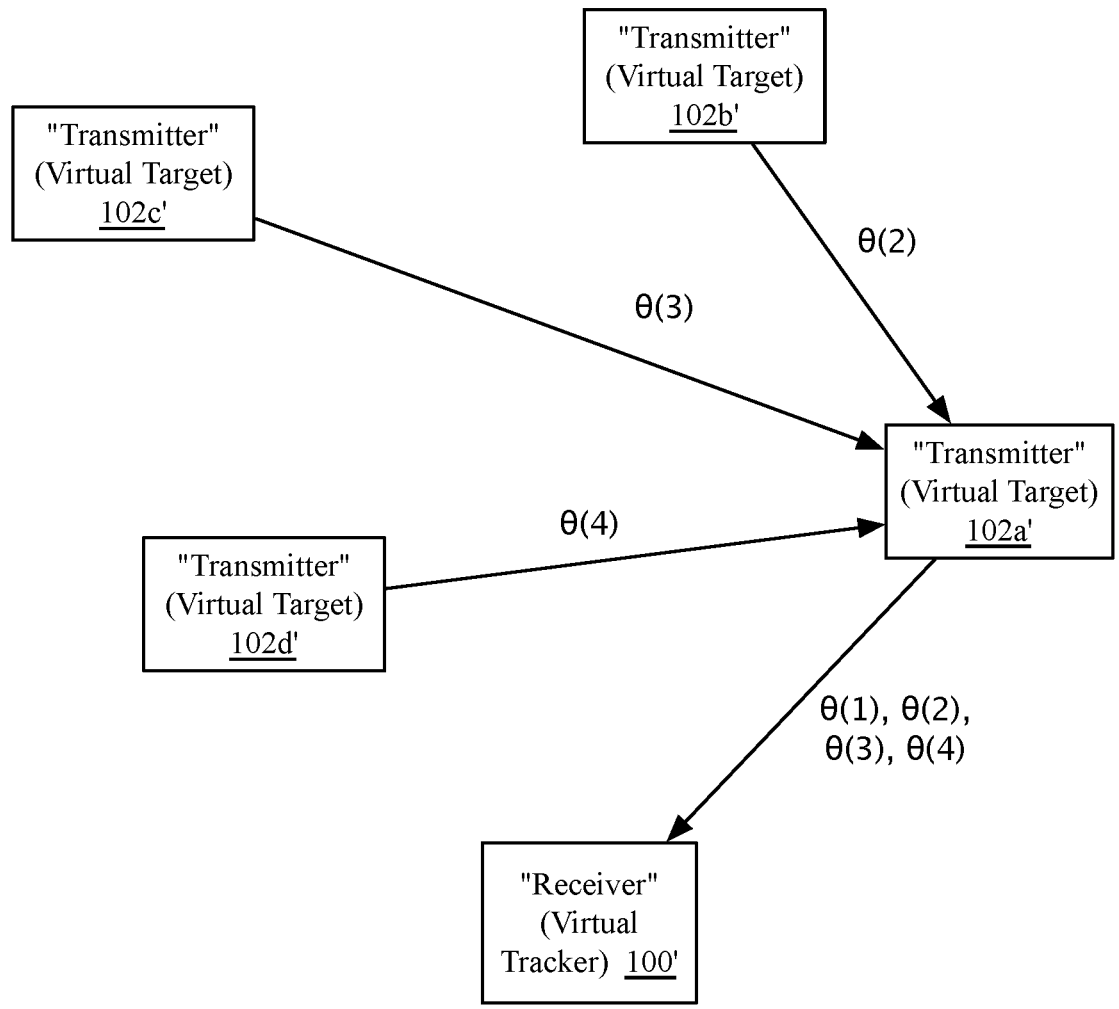

As discussed above, each virtual target 102' may communicate AoA/AoD measurements back to the virtual tracker 100' via a mesh network. In some implementations, this means that one or more virtual targets 102' may receive measurements from other virtual targets 102' and aggregate and/or forward the measurements to the virtual tracker. For example, referring briefly to FIG. 2C, after performing AoA/AoD measurements, each of one or more virtual targets 102b'-102d' may transmit their measurements through the mesh network to another network node, e.g. virtual target 102a'. The virtual target 102a', upon receipt of the measurements, may forward them to the virtual tracker 100', either via separate messages or concatenated together. For example, the measurements may be transmitted as XML data including device identifiers of each virtual target with corresponding measurements; may be transmitted as parameter-value pairs in a representational state transfer (RESTful) request; may be transmitted as a file attachment; or any other such method or protocol. For a large network with many devices, this may reduce the number of transmissions to be received and processed by the virtual tracker 100', further saving processing and battery life.

Figure 2D:
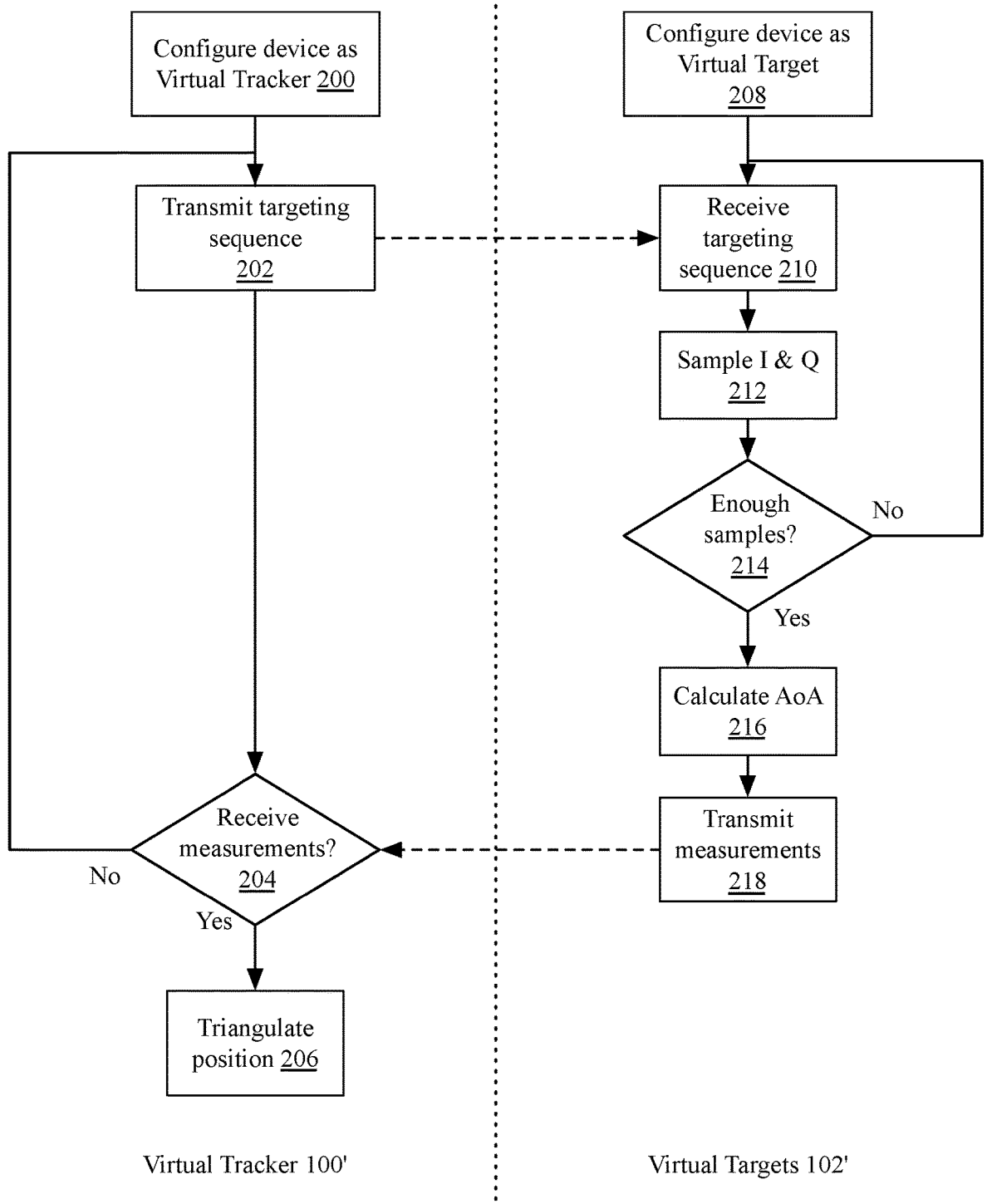
FIG. 2D is a flow diagram of an implementation of a method for virtual Angle of Arrival tracking.

FIG. 2D is a flow chart of an implementation of a method for virtual AoA/AoD tracking, divided into a portion performed by a virtual tracker 100' and a portion performed by one or more virtual targets 102'. At step 200, the "receiver" of FIGS. 2A-2C or virtual tracker 100' may be configured as a virtual tracker. Similarly, at step 208, a "transmitter" of FIGS. 2A-2C or virtual target 102' may be configured as a virtual target. In some implementations, these configurations may be applied as a result of a handshake or capability exchange. For example, the devices may start in a single-antenna or multi-antenna broadcast mode, and, upon exchanging a handshake or capability exchange or similar communication, may shift to a single- or multi-antenna, angle- or position-discovery mode.

At step 202, the virtual tracker 100' may transmit a targeting sequence, which may comprise a string of predetermined bits or other data, at one or more predetermined frequencies. The transmissions may be periodically repeated, until the virtual tracker 100' receives one or more AoA/AoD measurements at step 204. Upon receiving the AoA/AoD measurements, at step 206, the virtual tracker 100' may triangulate its position relative to the virtual targets 102'.

At step 210, a virtual target 102' may receive the targeting sequence 210. At step 212, the virtual target 102' may sample amplitude and phase components of the received sequence signal. If enough samples have not been received to perform an accurate AoA/AoD calculation (e.g. according to a predetermined threshold number of samples or similar restriction), then steps 201-212 may be repeated. If enough samples have been received, then at step 216, the target device 102' may calculate an AoA and/or AoD for the signal, as discussed above and incorporating an array characterization model in some implementations. At step 218, the virtual target 102' may transmit its calculated AoA and/or AoD (and, in some implementations, a received signal strength indicator for the received broadcast signal). The transmission may be via the mesh network of the virtual targets and virtual tracker, and accordingly, may be transmitted and forwarded via one or more intermediary devices. Similarly, in some implementations, the virtual target 102' may receive measurements from another virtual target and may forward or retransmit the received measurements to other entities of the mesh network.

Accordingly, the above discussed systems and methods allow a reversed Tracker-Target relationship via a virtual Tracker/virtual Target configuration, leveraging the processing power of the virtual Targets to save processing and energy utilization by the virtual Tracker. In one aspect, the present disclosure describes a method for virtual angle-of-arrival tracking. The method includes broadcasting, by a wireless interface of a first device configured as a virtual tracker to one or more additional devices configured as virtual targets, a tracking sequence. The method also includes receiving, by the wireless interface of the first device, from each of the one or more additional devices configured as virtual targets, an angle-of-arrival measurement by said additional device of the broadcast tracking sequence. The method also includes calculating, by a processor of the first device, from an aggregation of the received angle-of-arrival measurements, a position of the first device relative to each of the one or more additional devices.

In some implementations, the method includes measuring, by the wireless interface of the first device, an angle-of-arrival at the first device of each of the received angle-of-arrival measurements from the one or more additional devices configured as virtual targets. In a further implementation, calculating the position of the first device relative to each of the one or more additional devices is further based on the measured angle-of-arrival at the first device of each of the received angle-of-arrival measurements from the one or more additional devices configured as virtual targets. In some implementations, the method includes receiving, by the wireless interface of the first device, from each of the one or more additional devices configured as virtual targets, an angle-of-departure measurement by said additional device of the broadcast tracking sequence. In a further implementation, calculating the position of the first device relative to each of the one or more additional devices is further based on the received angle-of-departure measurements from the one or more additional devices configured as virtual targets.

In some implementations, the method includes rebroadcasting, by the wireless interface of the first device, the tracking sequence, responsive to receiving fewer than a predetermined threshold number of angle-of-arrival measurements from the one or more additional devices. In some implementations, the method includes broadcasting the tracking sequence by broadcasting signals at a plurality of operating frequencies. In some implementations, the method includes calculating the position of the first device relative to each of the one or more additional devices by determining an angle to each of the one or more additional devices equivalent to an angle-of-arrival identified in a corresponding measurement. In some implementations, the method includes receiving, from each of the one or more additional devices configured as virtual targets, a received signal strength measurement by said additional device of the broadcast tracking sequence. In a further implementation, calculating the position of the first device relative to each of the one or more additional devices is further responsive to the received signal strength measurements.

In another aspect, the present disclosure is directed to a system for virtual angle-of-arrival tracking. The system includes a first device comprising a wireless interface and a controller. The wireless interface is configured to: broadcast, as a virtual tracker to one or more additional devices configured as virtual targets, a tracking sequence; and receive, from each of the one or more additional devices configured as virtual targets, an angle-of-arrival measurement by said additional device of the broadcast tracking sequence. The controller is configured to calculate, from an aggregation of the received angle-of-arrival measurements, a position of the first device relative to each of the one or more additional devices.

In some implementations, the wireless interface is further configured to measure an angle-of-arrival at the first device of each of the received angle-of-arrival measurements from the one or more additional devices configured as virtual targets. In a further implementation, the controller is further configured to calculate the position of the first device relative to each of the one or more additional devices based on the measured angle-of-arrival at the first device of each of the received angle-of-arrival measurements from the one or more additional devices configured as virtual targets.

In some implementations, the wireless interface is further configured to receive from each of the one or more additional devices configured as virtual targets, an angle-of-departure measurement by said additional device of the broadcast tracking sequence. In a further implementation, the controller is further configured to calculate the position of the first device relative to each of the one or more additional devices based on the received angle-of-departure measurements from the one or more additional devices configured as virtual targets.

In some implementations, the wireless interface is further configured to rebroadcast the tracking sequence, responsive to receiving fewer than a predetermined threshold number of angle-of-arrival measurements from the one or more additional devices.

In some implementations, the wireless interface is further configured to broadcasting the tracking sequence at a plurality of operating frequencies. In some implementations, the controller is further configured to calculate the position of the first device relative to each of the one or more additional devices by determining an angle to each of the one or more additional devices equivalent to an angle-of-arrival identified in a corresponding measurement.

In some implementations, the wireless interface is further configured to receive, from each of the one or more additional devices configured as virtual targets, a received signal strength measurement by said additional device of the broadcast tracking sequence. In a further implementation, the controller is further configured to calculate the position of the first device relative to each of the one or more additional devices is further responsive to the received signal strength measurements.

B. Computing and Network Environment

Figure 3A:
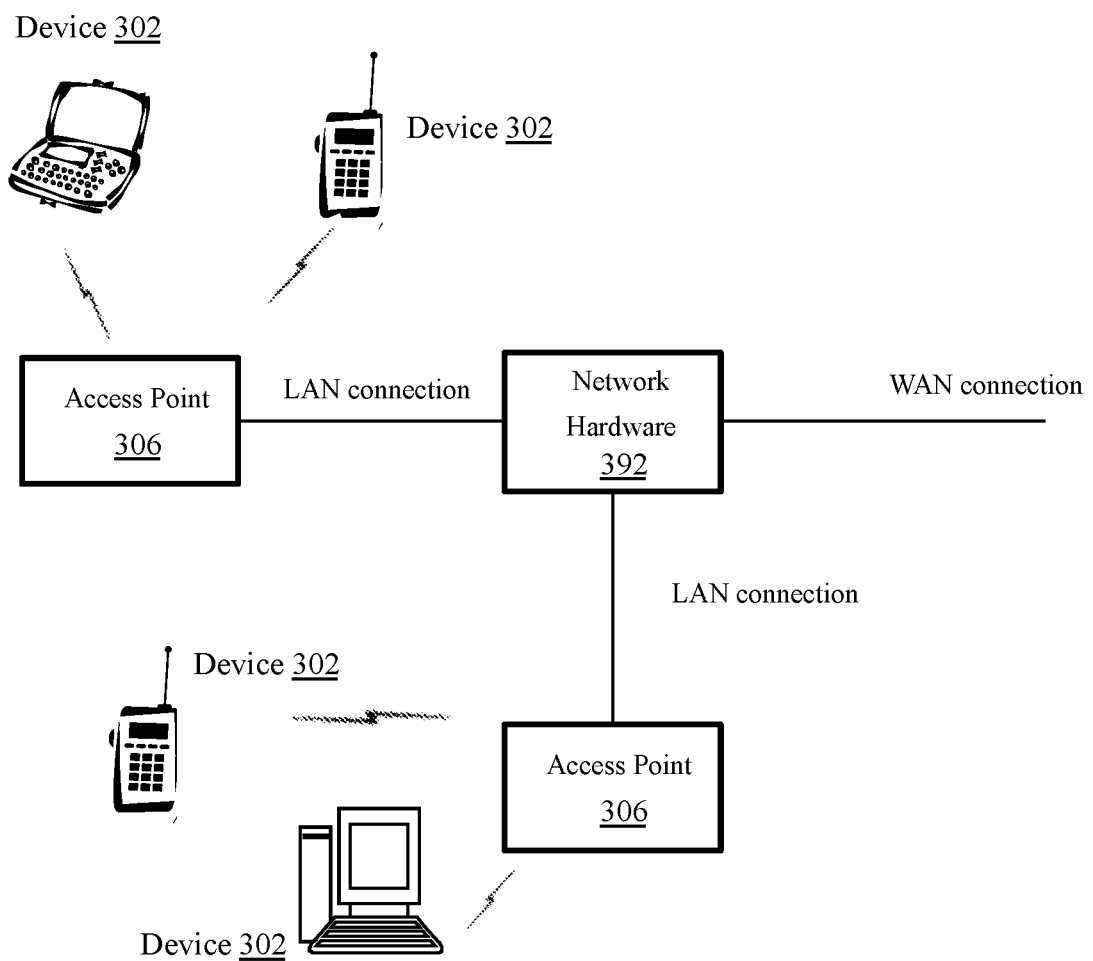
FIG. 3A is a block diagram depicting an embodiment of a network environment including one or more wireless devices in communication with one or more other wireless devices or access points.

Having discussed specific embodiments of the present solution, it may be helpful to describe aspects of the operating environment as well as associated system components (e.g., hardware elements) in connection with the methods and systems described herein. Referring to FIG. 3A, an embodiment of a network environment is depicted. In brief overview, the network environment includes a wireless communication system that includes one or more access points 306, one or more wireless communication devices 302 and a network hardware component 392. The wireless communication devices 302 may for example include laptop computers 302, tablets 302, personal computers 302 and/or cellular telephone devices 302. The details of an embodiment of each wireless communication device and/or access point are described in greater detail with reference to FIGS. 3B and 3C. The network environment can be an ad hoc network environment, an infrastructure wireless network environment, a subnet environment, etc. in one embodiment The access points (APs) 306 may be operably coupled to the network hardware 392 via local area network connections. The network hardware 392, which may include a router, gateway, switch, bridge, modem, system controller, appliance, etc., may provide a local area network connection for the communication system. Each of the access points 306 may have an associated antenna or an antenna array to communicate with the wireless communication devices 302 in its area. The wireless communication devices 302 may register with a particular access point 306 to receive services from the communication system (e.g., via a SU-MIMO or MU-MIMO configuration). For direct connections (e.g., point-to-point communications), some wireless communication devices 302 may communicate directly via an allocated channel and communications protocol. Some of the wireless communication devices 302 may be mobile or relatively static with respect to the access point 306.

In some embodiments an access point 306 includes a device or module (including a combination of hardware and software) that allows wireless communication devices 302 to connect to a wired network using Wi-Fi, or other standards. An access point 306 may sometimes be referred to as an wireless access point (WAP). An access point 306 may be configured, designed and/or built for operating in a wireless local area network (WLAN). An access point 306 may connect to a router (e.g., via a wired network) as a standalone device in some embodiments. In other embodiments, an access point can be a component of a router. An access point 306 can provide multiple devices 302 access to a network. An access point 306 may, for example, connect to a wired Ethernet connection and provide wireless connections using radio frequency links for other devices 302 to utilize that wired connection. An access point 306 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 306 may be used for (e.g., in-home or in-building) wireless networks (e.g., IEEE 802.11, Bluetooth, ZigBee, any other type of radio frequency based network protocol and/or variations thereof). Each of the wireless communication devices 302 may include a built-in radio and/or is coupled to a radio. Such wireless communication devices 302 and/or access points 306 may operate in accordance with the various aspects of the disclosure as presented herein to enhance performance, reduce costs and/or size, and/or enhance broadband applications. Each wireless communication devices 302 may have the capacity to function as a client node seeking access to resources (e.g., data, and connection to networked nodes such as servers) via one or more access points 306.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 3B:
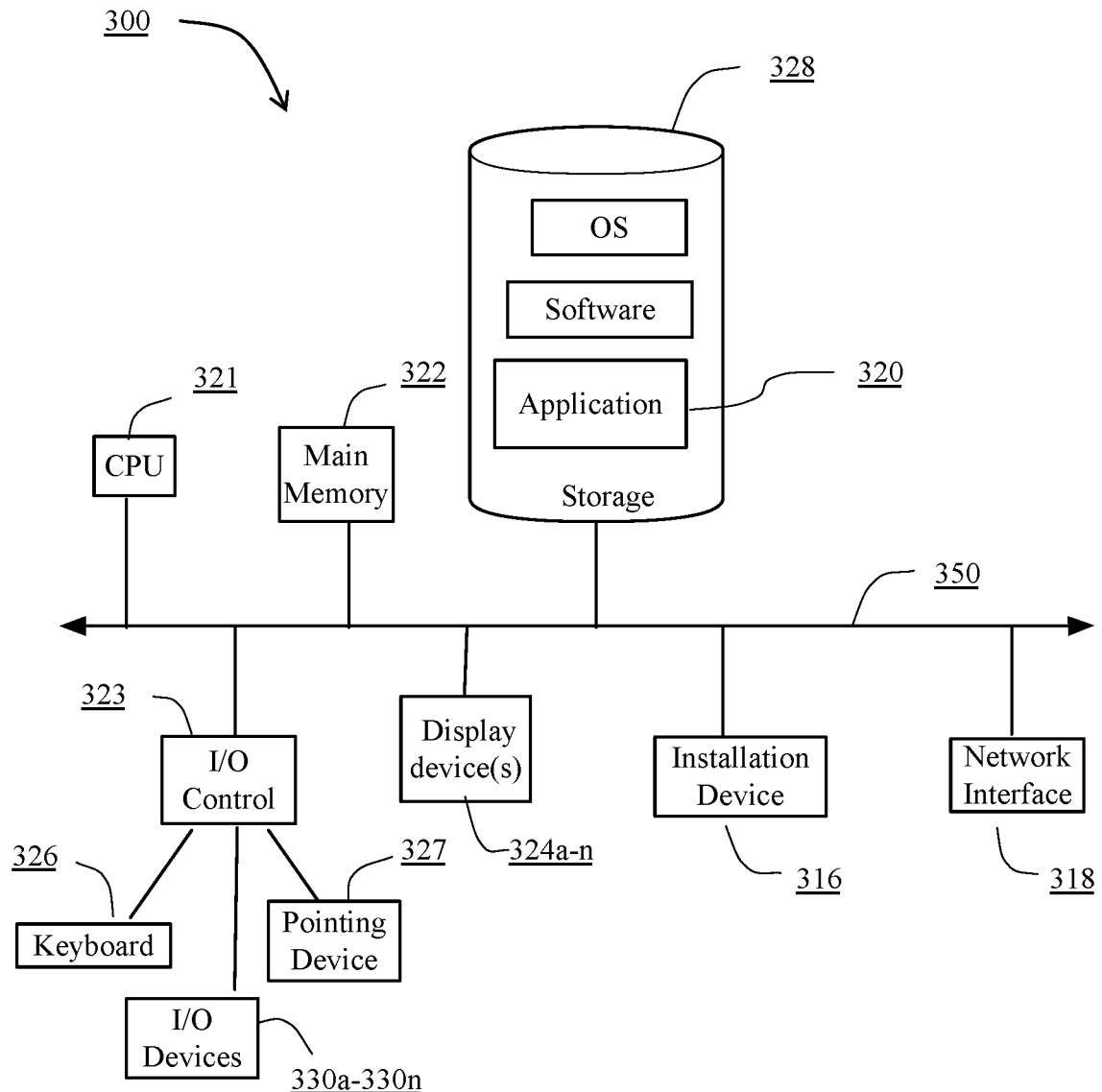
FIGS. 3B and 3C are block diagrams depicting embodiments of computing devices useful in connection with the methods and systems described herein.
Figure 3C:
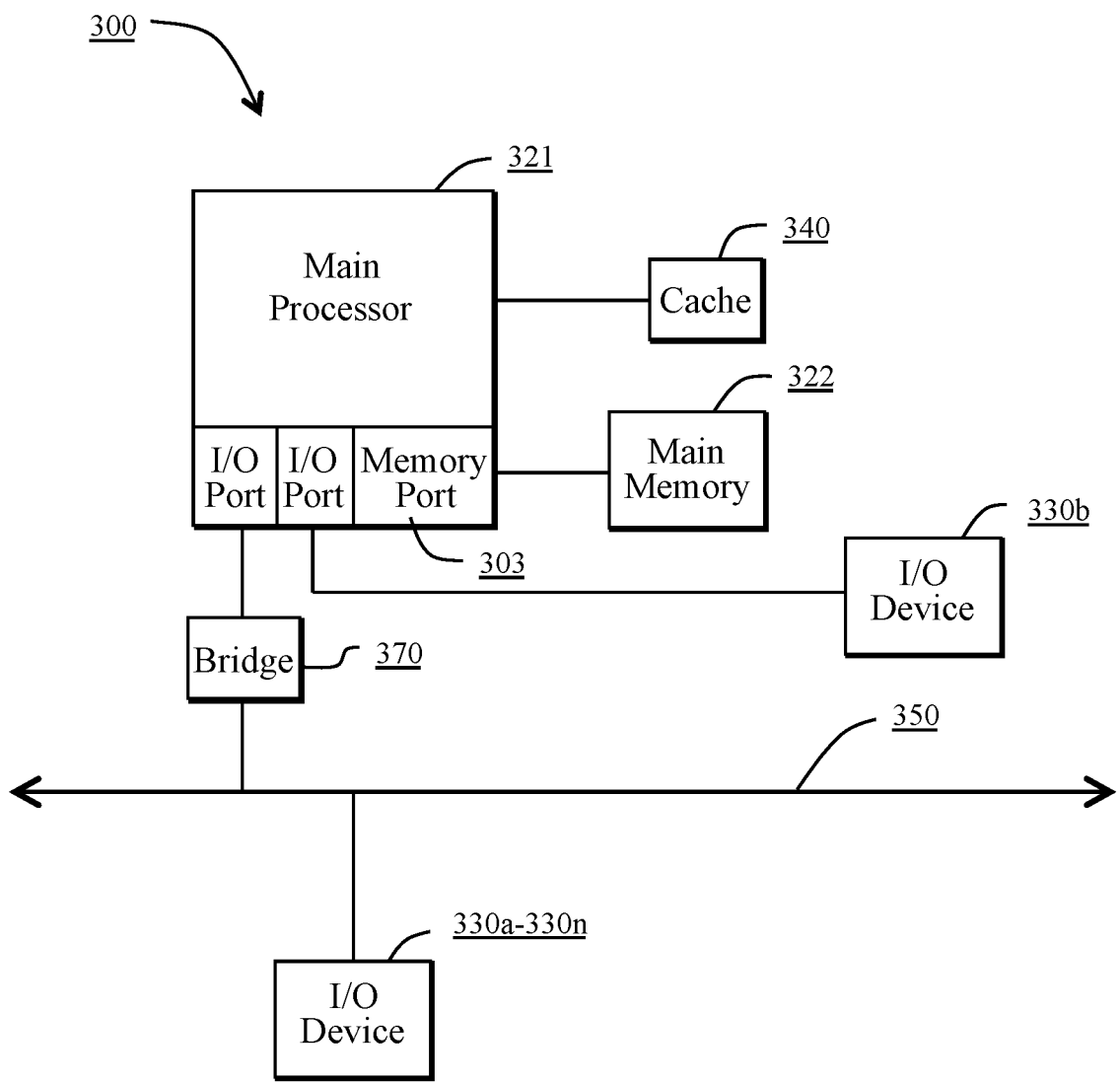

The communications device(s) 302 and access point(s) 306 may be deployed as and/or executed on any type and form of computing device, such as a computer, network device or appliance capable of communicating on any type and form of network and performing the operations described herein. FIGS. 3B and 3C depict block diagrams of a computing device 300 useful for practicing an embodiment of the wireless communication devices 302 or the access point 306. As shown in FIGS. 3B and 3C, each computing device 300 includes a central processing unit 321, and a main memory unit 322. As shown in FIG. 3B, a computing device 300 may include a storage device 328, an installation device 316, a network interface 318, an I/O controller 323, display devices 324a-324n, a keyboard 326 and a pointing device 327, such as a mouse. The storage device 328 may include, without limitation, an operating system and/or software. As shown in FIG. 3C, each computing device 300 may also include additional optional elements, such as a memory port 303, a bridge 370, one or more input/output devices 330a-330n (generally referred to using reference numeral 330), and a cache memory 340 in communication with the central processing unit 321.

The central processing unit 321 is any logic circuitry that responds to and processes instructions fetched from the main memory unit 322. In many embodiments, the central processing unit 321 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 300 may be based on any of these processors, or any other processor capable of operating as described herein.

Main memory unit 322 may be one or more memory chips capable of storing data and allowing any storage location to be directly accessed by the microprocessor 321, such as any type or variant of Static random access memory (SRAM), Dynamic random access memory (DRAM), Ferroelectric RAM (FRAM), NAND Flash, NOR Flash and Solid State Drives (SSD). The main memory 322 may be based on any of the above described memory chips, or any other available memory chips capable of operating as described herein. In the embodiment shown in FIG. 3B, the processor 321 communicates with main memory 322 via a system bus 350 (described in more detail below). FIG. 3C depicts an embodiment of a computing device 300 in which the processor communicates directly with main memory 322 via a memory port 303. For example, in FIG. 3C the main memory 322 may be DRDRAM.

FIG. 3C depicts an embodiment in which the main processor 321 communicates directly with cache memory 340 via a secondary bus, sometimes referred to as a backside bus. In other embodiments, the main processor 321 communicates with cache memory 340 using the system bus 350. Cache memory 340 typically has a faster response time than main memory 322 and is provided by, for example, SRAM, BSRAM, or EDRAM. In the embodiment shown in FIG. 3C, the processor 321 communicates with various I/O devices 330 via a local system bus 350. Various buses may be used to connect the central processing unit 321 to any of the I/O devices 330, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 324, the processor 321 may use an Advanced Graphics Port (AGP) to communicate with the display 324. FIG. 3C depicts an embodiment of a computer 300 in which the main processor 321 may communicate directly with I/O device 330b, for example via HYPERTRANSPORT, RAPIDIO, or INFINIBAND communications technology. FIG. 3C also depicts an embodiment in which local busses and direct communication are mixed: the processor 321 communicates with I/O device 330a using a local interconnect bus while communicating with I/O device 330b directly.

A wide variety of I/O devices 330a-330n may be present in the computing device 300. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 323 as shown in FIG. 3B. The I/O controller may control one or more I/O devices such as a keyboard 326 and a pointing device 327, e.g., a mouse or optical pen. Furthermore, an I/O device may also provide storage and/or an installation medium 316 for the computing device 300. In still other embodiments, the computing device 300 may provide USB connections (not shown) to receive handheld USB storage devices such as the USB Flash Drive line of devices manufactured by Twintech Industry, Inc. of Los Alamitos, Calif.

Referring again to FIG. 3B, the computing device 300 may support any suitable installation device 316, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 300 may further include a storage device, such as one or more hard disk drives or redundant arrays of independent disks, for storing an operating system and other related software, and for storing application software programs such as any program or software 320 for implementing (e.g., configured and/or designed for) the systems and methods described herein. Optionally, any of the installation devices 316 could also be used as the storage device. Additionally, the operating system and the software can be run from a bootable medium.

Furthermore, the computing device 300 may include a network interface 318 to interface to the network 304 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 300 communicates with other computing devices 300' via any type and/or form of gateway or tunneling protocol such as Secure Socket Layer (SSL) or Transport Layer Security (TLS). The network interface 318 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

In some embodiments, the computing device 300 may include or be connected to one or more display devices 324a-324n. As such, any of the I/O devices 330a-330n and/or the I/O controller 323 may include any type and/or form of suitable hardware, software, or combination of hardware and software to support, enable or provide for the connection and use of the display device(s) 324a-324n by the computing device 300. For example, the computing device 300 may include any type and/or form of video adapter, video card, driver, and/or library to interface, communicate, connect or otherwise use the display device(s) 324a-324n. In one embodiment, a video adapter may include multiple connectors to interface to the display device(s) 324a-324n. In other embodiments, the computing device 300 may include multiple video adapters, with each video adapter connected to the display device(s) 324a-324n. In some embodiments, any portion of the operating system of the computing device 300 may be configured for using multiple displays 324a-324n. One ordinarily skilled in the art will recognize and appreciate the various ways and embodiments that a computing device 300 may be configured to have one or more display devices 324a-324n.

In further embodiments, an I/O device 330 may be a bridge between the system bus 350 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 300 of the sort depicted in FIGS. 3B and 3C may operate under the control of an operating system, which control scheduling of tasks and access to system resources. The computing device 300 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 300 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 300 has sufficient processor power and memory capacity to perform the operations described herein.

In some embodiments, the computing device 300 may have different processors, operating systems, and input devices consistent with the device. For example, in one embodiment, the computing device 300 is a smart phone, mobile device, tablet or personal digital assistant. In still other embodiments, the computing device 300 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 300 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed:

1. A method for virtual angle-of-arrival tracking, comprising:
    broadcasting, by a wireless interface of a first device configured as a virtual tracker to one or more additional devices configured as virtual targets, a tracking sequence;
    receiving, by the wireless interface of the first device, from each of the one or more additional devices configured as virtual targets, an angle-of-arrival measurement by said additional device of the broadcast tracking sequence;
    rebroadcasting, by the wireless interface of the first device, the tracking sequence, responsive to receiving fewer than a predetermined threshold number of angle-of-arrival measurements from the one or more additional devices; and
    calculating, by a processor of the first device, from an aggregation of the received angle-of-arrival measurements, a position of the first device relative to each of the one or more additional devices.

2. The method of claim 1, further comprising measuring, by the wireless interface of the first device, an angle-of-arrival at the first device of each of the received angle-of-arrival measurements from the one or more additional devices configured as virtual targets.

3. The method of claim 2, wherein calculating the position of the first device relative to each of the one or more additional devices is further based on the measured angle-of-arrival at the first device of each of the received angle-of-arrival measurements from the one or more additional devices configured as virtual targets.

4. The method of claim 1, further comprising receiving, by the wireless interface of the first device, from each of the one or more additional devices configured as virtual targets, an angle-of-departure measurement by said additional device of the broadcast tracking sequence.

5. The method of claim 4, wherein calculating the position of the first device relative to each of the one or more additional devices is further based on the received angle-of-departure measurements from the one or more additional devices configured as virtual targets.

6. The method of claim 1, wherein broadcasting the tracking sequence further comprises broadcasting signals at a plurality of operating frequencies.

7. The method of claim 1, wherein calculating the position of the first device relative to each of the one or more additional devices further comprises determining an angle to each of the one or more additional devices equivalent to an angle-of-arrival identified in a corresponding measurement.

8. The method of claim 1, further comprising receiving, from each of the one or more additional devices configured as virtual targets, a received signal strength measurement by said additional device of the broadcast tracking sequence.

9. The method of claim 8, wherein calculating the position of the first device relative to each of the one or more additional devices is further responsive to the received signal strength measurements.

10. A system for virtual angle-of-arrival tracking, comprising:
a first device comprising a wireless interface and a controller;
wherein the wireless interface is configured to:
broadcast, as a virtual tracker to one or more additional devices configured as virtual targets, a tracking sequence,
receive, from each of the one or more additional devices configured as virtual targets, an angle-of-arrival measurement by said additional device of the broadcast tracking sequence, and
rebroadcast the tracking sequence, responsive to receiving fewer than a predetermined threshold number of angle-of-arrival measurements from the one or more additional devices; and
wherein the controller is configured to calculate, from an aggregation of the received angle-of-arrival measurements, a position of the first device relative to each of the one or more additional devices.

11. The system of claim 10, wherein the wireless interface is further configured to measure an angle-of-arrival at the first device of each of the received angle-of-arrival measurements from the one or more additional devices configured as virtual targets.

12. The system of claim 11, wherein the controller is further configured to calculate the position of the first device relative to each of the one or more additional devices based on the measured angle-of-arrival at the first device of each of the received angle-of-arrival measurements from the one or more additional devices configured as virtual targets.

13. The system of claim 10, wherein the wireless interface is further configured to receive from each of the one or more additional devices configured as virtual targets, an angle-of-departure measurement by said additional device of the broadcast tracking sequence.

14. The system of claim 13, wherein the controller is further configured to calculate the position of the first device relative to each of the one or more additional devices based on the received angle-of-departure measurements from the one or more additional devices configured as virtual targets.

15. The system of claim 10, wherein the wireless interface is further configured to broadcasting the tracking sequence at a plurality of operating frequencies.

16. The system of claim 10, wherein the controller is further configured to calculate the position of the first device relative to each of the one or more additional devices by determining an angle to each of the one or more additional devices equivalent to an angle-of-arrival identified in a corresponding measurement.

17. The system of claim 10, wherein the wireless interface is further configured to receive, from each of the one or more additional devices configured as virtual targets, a received signal strength measurement by said additional device of the broadcast tracking sequence.

18. The system of claim 17, wherein the controller is further configured to calculate the position of the first device relative to each of the one or more additional devices is further responsive to the received signal strength measurements.

* * * * *